UNITED STATES PATENT OFFICE.

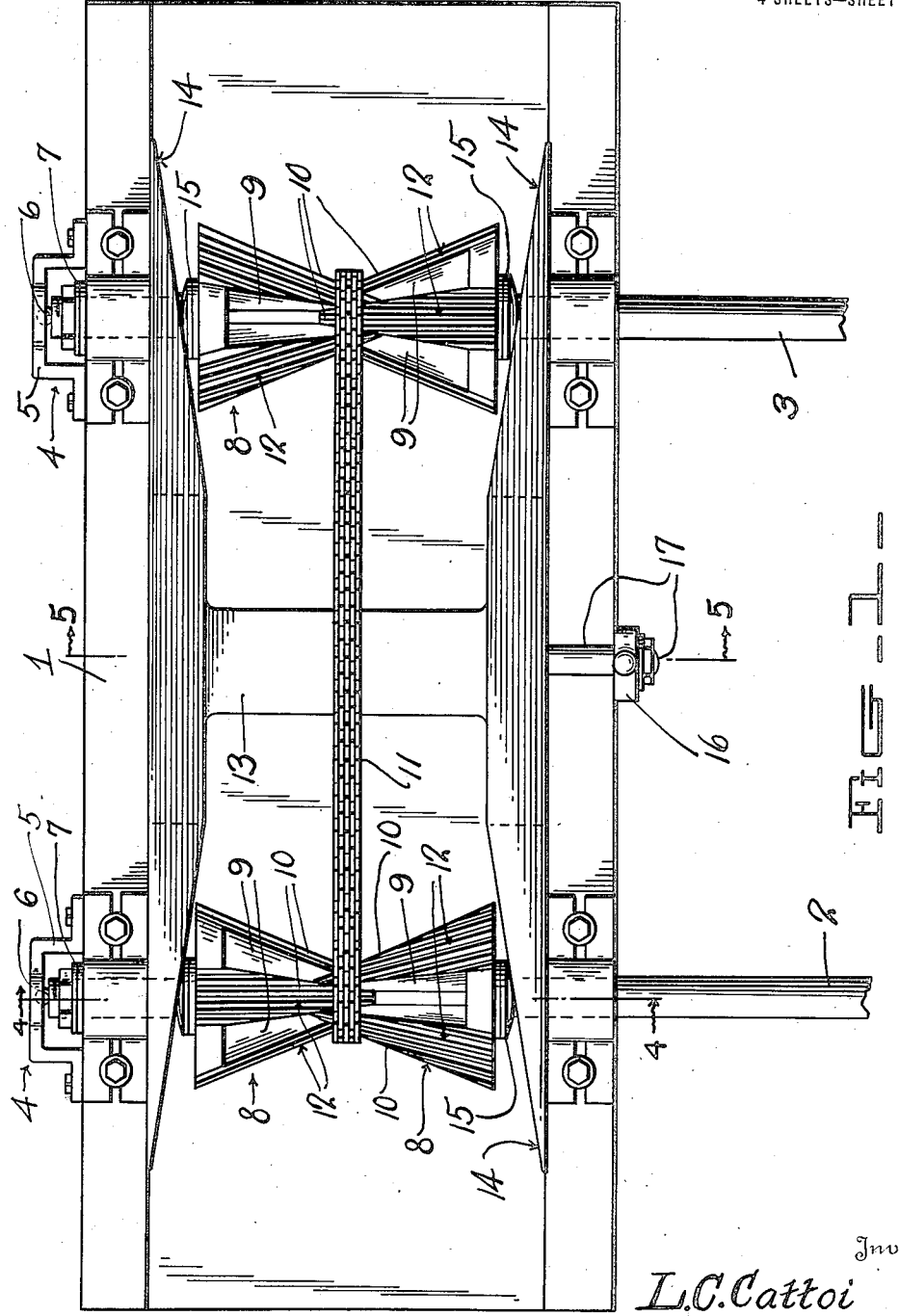

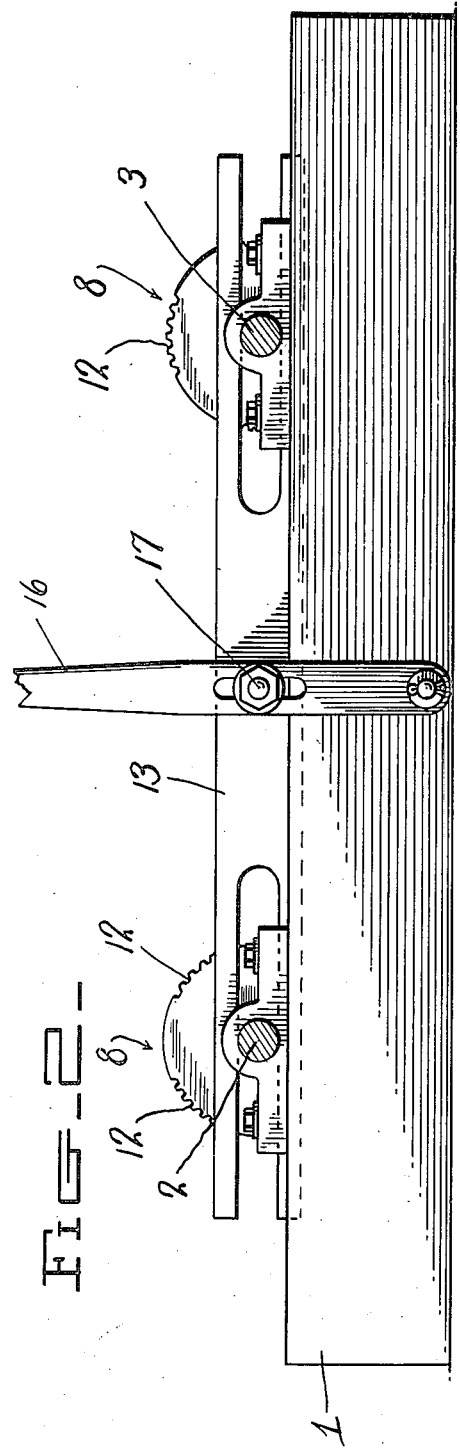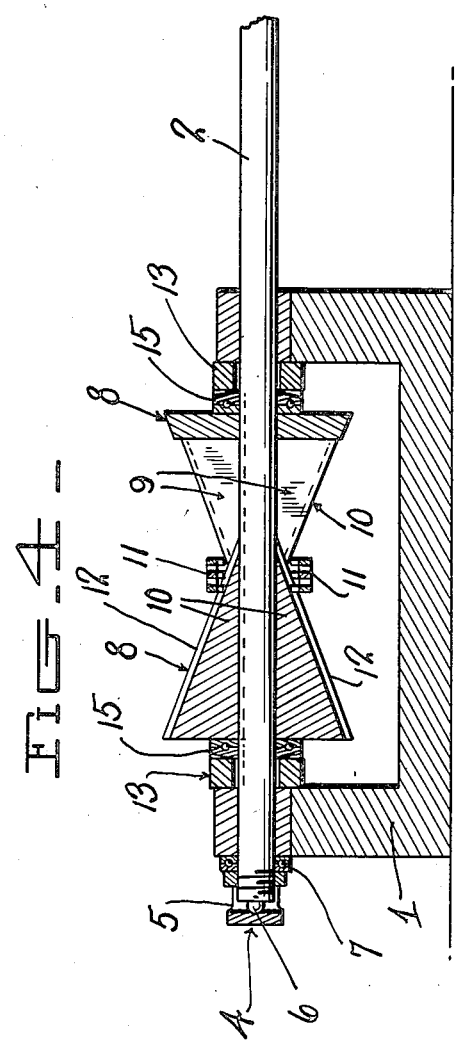

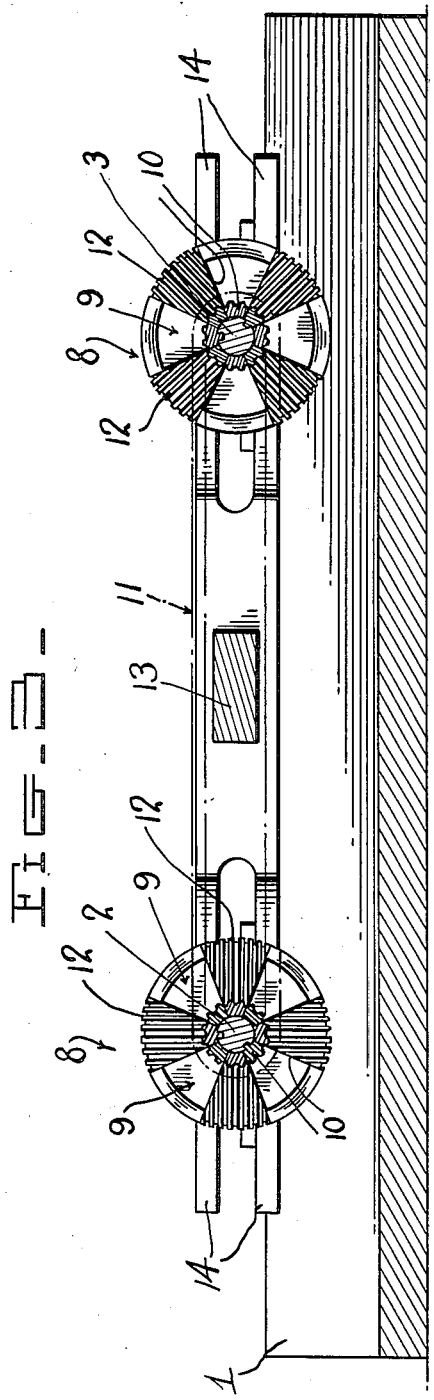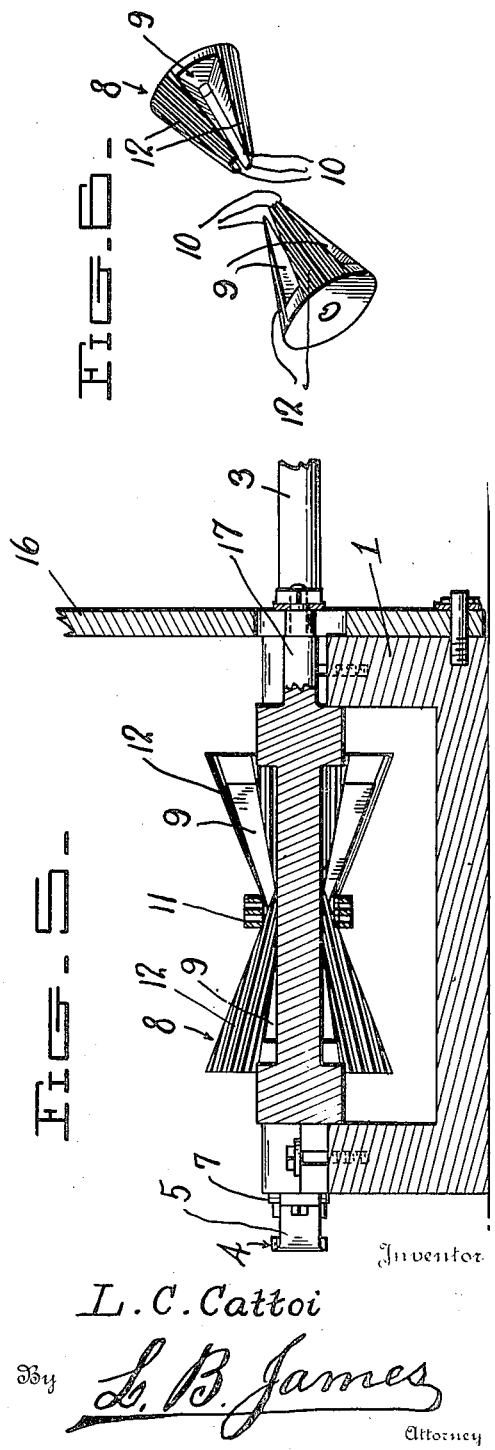

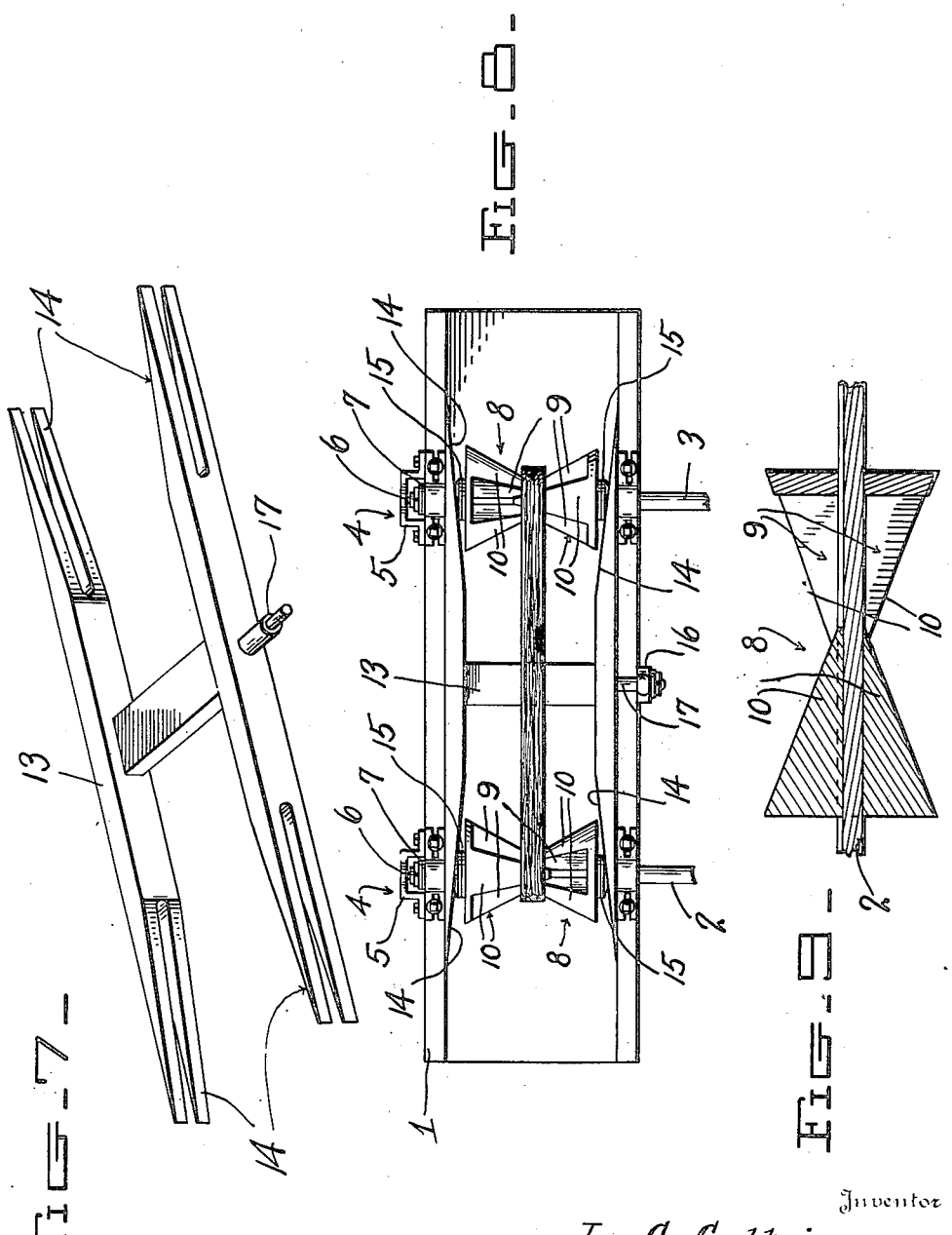

LOUIS C. CATTOI, OF HURLEY, WISCONSIN.

GEARLESS TRANSMISSION MECHANISM.

1,421,908.  Specification of Letters Patent.   Patented July 4, 1922.

Application filed February 24, 1921. Serial No. 447,455.

*To all whom it may concern:*

Be it known that I, LOUIS C. CATTOI, a citizen of the United States, residing at Hurley, in the county of Iron and State of Wisconsin, have invented certain new and useful Improvements in Gearless Transmission Mechanism, of which the following is a specification.

This invention relates to transmission means of the gearless type, the general object of the invention being to provide means for securing a variable speed without the use of gears or clutches and by a single movement of an operating lever.

Another object of the invention is to provide means for transmitting the power through an endless belt with means for increasing or decreasing the diameter of the belt engaging parts so as to secure the variable speed.

A still further object of the invention is to provide means whereby either a chain drive or a belt drive can be used by making slight changes in the transmission means.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the invention.

Figure 2 is a side view thereof.

Figure 3 is a longitudinal section.

Figure 4 is a cross sectional view on line 4—4 of Figure 1.

Figure 5 is a similar view on line 5—5 of Figure 1.

Figure 6 is a detail view of the cones in juxtaposition.

Figure 7 is a detail view of the shifting yoke.

Figure 8 is a plan view of a modified form.

Figure 9 is a detail view of the cones.

In these views 1 indicates the supporting casing of the device in which is journaled the drive shaft 2 and the driven shaft 3. Each of these shafts is provided with end thrust means 4 which preferably consist of a cap 5 secured to the exterior of the casing and carrying a spherical member 6 which engages the end of the shaft. A thrust bearing 7 is located in the cap and surrounds the shaft and acts to prevent longitudinal movement of the shaft away from the member 6.

Each shaft has keyed thereto a pair of cones 8 which are arranged to have sliding movement on the shaft and which are reversely arranged so that their small ends contact. Each cone is provided with a number of longitudinally extending slots 9 spaced apart to leave the portions 10 and these portions 10 of one cone are adapted to engage with the slots 9 of the other cone so that when the cones are forced inwardly they will telescope and thus the diameter of the belt receiving part will be increased. The belt or endless chain is shown at 11 and when a belt drive is used the surfaces of the cones are plain, as shown in the modified form of the device, but when a silent chain drive is used teeth 12 are formed in the tapered walls of the cones to grip the chain. As the slots 9 are of tapered shape the portions 10 will also be of tapered shape and as the teeth 12 extend longitudinally there will be more of these teeth adjacent the wide ends of the cones than at the small ends. Thus as the diameter of the cone drive is increased by forcing the cones together the number of teeth will also be increased to increase the frictional engagement between the cones and chain.

The means for expanding and contracting the cones consists of an H-shaped member 13 arranged in the casing and having the inner faces of its parallel parts beveled, as at 14, these beveled faces engaging thrust blocks 15 at the wide ends of the cones with the outer faces of the member engaging the inner walls of the casing. Thus when said member 13 is shifted towards one end of the casing the beveled faces thereon engaging the thrust blocks will thrust the cones towards each other and thus increase the diameter of the belt engaging parts of the cones. As this is taking place the opposite pair of cones will be permitted to expand under the pressure exerted by the belt. Thus it will be seen that the diameters of the belt engaging portions can be increased or diminished to varying extents so as to drive the driven shaft at the speed desired.

The means for shifting the H-shaped member consists of a lever 16 pivoted intermediate its ends to the casing and engaging a projection 17 on the H-shaped member. Thus by rocking the lever upon its pivot the member 13 is shifted from one side of the casing to the other as desired.

My improved transmission gives a variable speed without the shifting of gears or engagement of clutches and by a single movement of the operating lever. The different speeds are secured by the expanding and contracting of the cones thus changing the diameter of the belt engaging portions of the cones.

As shown the teeth on the surfaces of the cones are cut parallel as on a straight spur gear. As the cones are contracted a greater number of teeth are brought into engagement with the belt.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A device of the class described comprising a casing, a drive shaft journaled therein, a driven shaft journaled therein, a pair of telescopic cones on each shaft, said cones having tapered slots therein for receiving tapered portions of the companion cone, an H-shaped member slidably mounted in the casing and having the inner faces of its parallel members beveled to engage the broad ends of the cones and a pivoted lever connected with said sliding member for moving the same.

2. A device of the class described comprising a casing, a pair of shafts journaled therein, thrust bearings for preventing longitudinal movement of the shafts, a pair of telescopic cones on each shaft, an endless belt engaging said cones, a thrust block on the broad end of each cone, a sliding member located in the casing and having beveled faces engaging the thrust blocks, means for shifting said member to contract and expand said cones, and longitudinally extending teeth on the cones.

In testimony whereof I affix my signature.

LOUIS C. CATTOI.